United States Patent

[11] 3,565,283

[72] Inventors Rinaldo Sciacero
Arlington Heights;
George G. Dominick, Hoffman Estates, Ill.
[21] Appl. No. 784,379
[22] Filed Dec. 17, 1968
[45] Patented Feb. 23, 1971
[73] Assignee Duncan Industries, Inc.
Elk Grove Village, Ill.

[54] TOKEN DISPENSING CONSTRUCTION FOR PARKING METERS
7 Claims, 11 Drawing Figs.

[52] U.S. Cl. .................................................. 221/197
[51] Int. Cl. .................................................... B65h 1/00
[50] Field of Search ...................................... 194/(PM), 7, 2; 221/259, 8, 69—74, 197; 206/59 (M), 58

[56] References Cited
UNITED STATES PATENTS

| | | | |
|---|---|---|---|
| 2,213,240 | 9/1940 | Clausen........................ | 194/(PM) |
| 2,872,007 | 2/1959 | Robb et al. ................... | 194/7 |
| 3,058,639 | 10/1962 | Frederick..................... | 194/(PM) |
| 3,283,886 | 11/1966 | Addis et al.................... | 221/70X |
| 3,395,829 | 8/1968 | Cogdell et al................. | 221/70X |

*Primary Examiner*—Stanley H. Tollberg
*Attorney*—McDougall, Hersh, Scott & Ladd ABSTRACT: A token dispensing construction wherein tokens in the form of tickets are provided in a roll whereby tickets can be dispensed one or more at a time through the use of driving means which direct the tickets through an opening in the meter housing. The driving means for achieving the dispensing action are directly connected to the time-setting mechanisms of the meter whereby the ticket dispensing is dependent upon the time-setting operation. In one form of the invention, the ticket-dispensing drive means are set during the time-setting operation with the actual dispensing movement occurring during return movement of the time-setting elements so that the ticket dispensing-drive is independent of the force and rate of movement applied by an individual manually operating the meter.

INVENTORS
Rinaldo Sciacero
George G. Dominick
by McDougall, Hersh,
Scott & Ladd
Attorneys

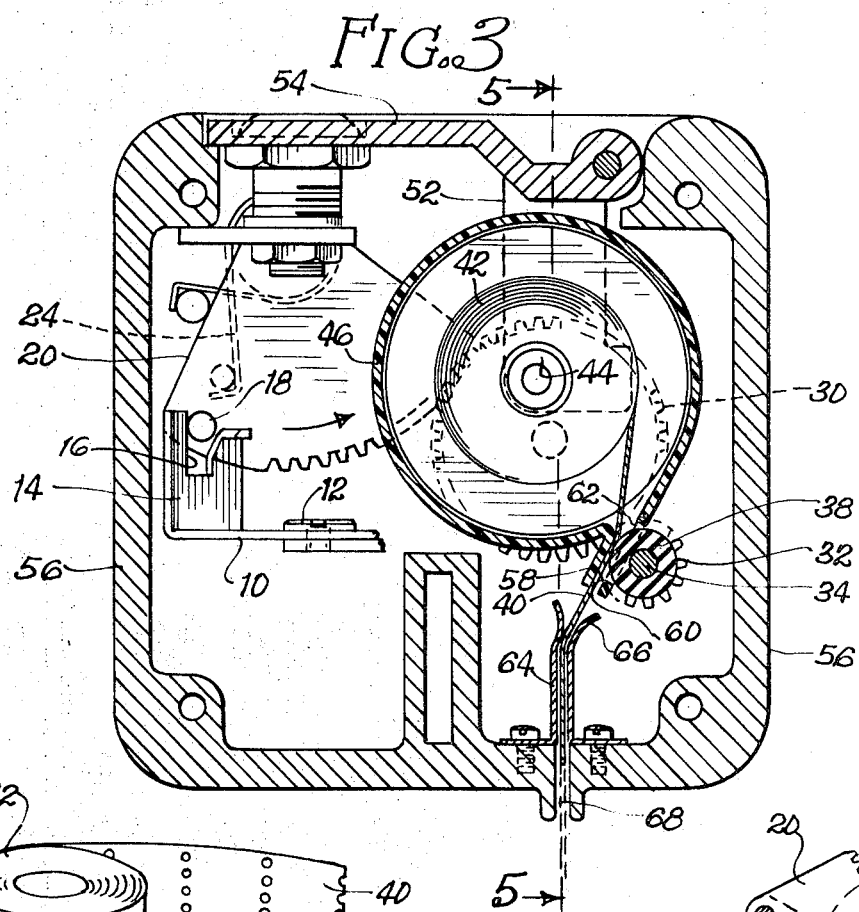
FIG. 3
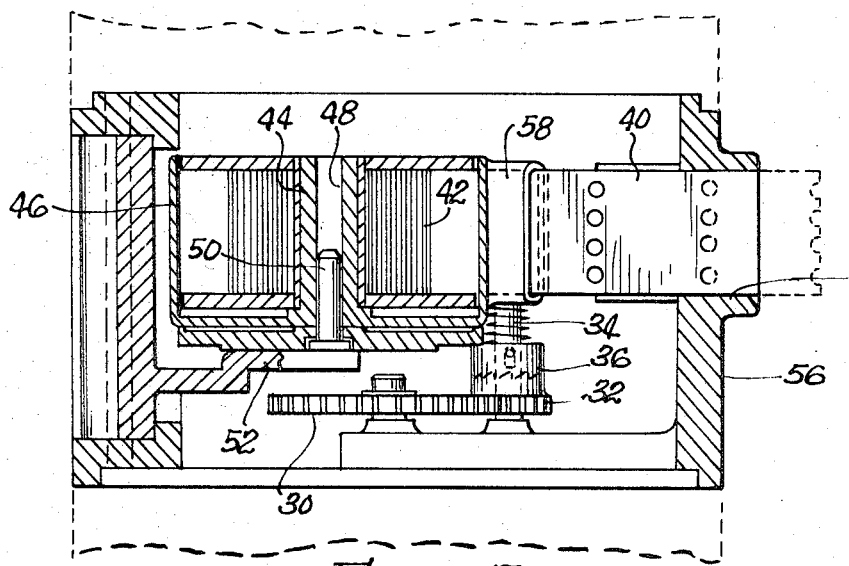
FIG. 4
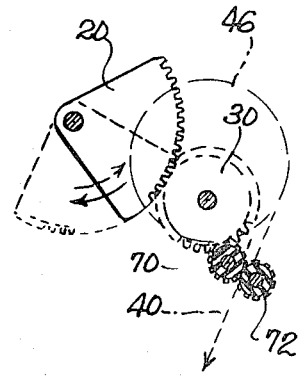
FIG. 6
FIG. 5

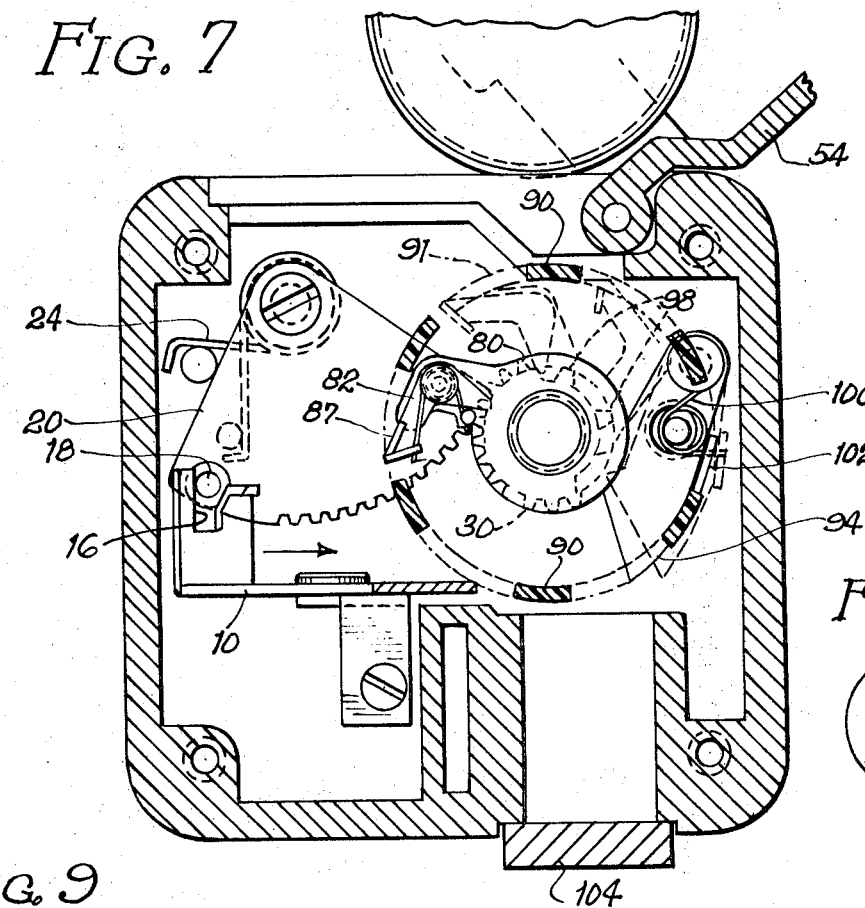
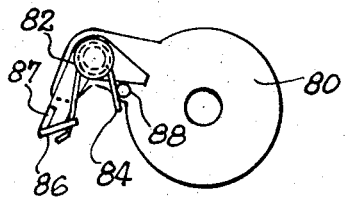
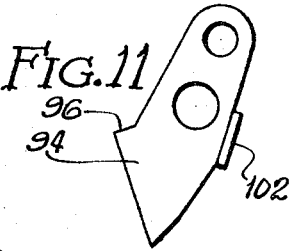
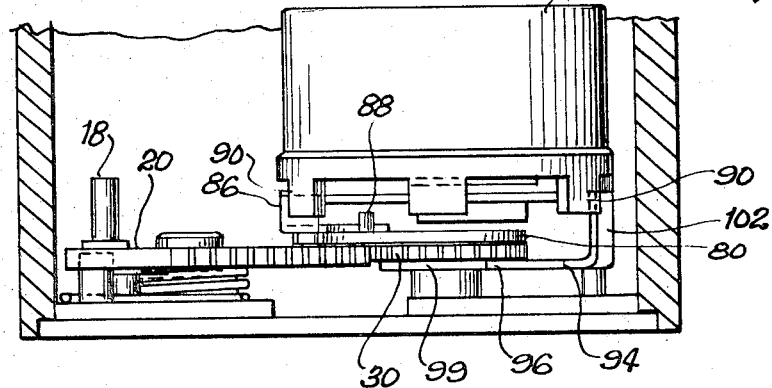

TOKEN DISPENSING CONSTRUCTION FOR PARKING METERS

This invention is directed to parking meter constructions of a type adapted to dispense tokens. One aspect of the invention involves a system wherein the tokens are in the form of tickets which are dispensed in accordance with the amount of time purchased by the individual operating the meter.

U.S. Pat. No. 2,070,445 provides a parking meter construction wherein tokens in the form of tickets are dispensed when money is inserted in the meter and time set thereon. In the particular structure described in this patent, the tokens were in the form of a small ticket, and the tickets were designed to provide a receipt for the money inserted in the meter. Such receipts were then redeemable in cash or trade at a store adjacent the location of the meter. In addition, it was contemplated that the tickets could be employed for safety slogans, advertising, or for purely informational purposes.

One difficulty involved with such meters concerned the inability of the meters to store a sufficient number of tokens within a reasonably small space. Thus, it is desirable to provide a large number of tokens to minimize the maintenance necessary for the meter operation. On the other hand, it is desirable to maintain the meters as small as possible to hold costs down and to maintain as neat an appearance as possible.

Carroll and Edington U.S. Pat. Nos. 3,208,573 and 3,212,614 provide constructions which permit the storing of substantial numbers of coinlike tokens within a relatively small space. A magazine defining a plurality of vertical bores can be filled with tokens, and a dispensing disc is associated with the construction whereby tokens can be successively removed from the bores. With this arrangement, the dispensing discs will be continuously replenished with tokens as long as some tokens remain in the magazine.

Sollenberger U.S. Pat. No. 3,272,299 also discloses a token-dispensing meter construction. This construction is particularly designed so that coinlike tokens will be dispensed even if unelapsed time remains on the meter, for example where the unelapsed time is insufficient for the individual parking his car, in which case the individual will deposit money to add time to the meter. In some prior art arrangements, a token would not be dispensed unless a complete stroke of the time indicating means took place, which, of course, would not occur if unelapsed time were on the meter. This can lead to dissatisfaction among individuals using the meters which would be totally objectionable to tradesmen depending upon the token dispensing concept to attract customers.

A distinct aspect of the invention relates to the drive mechanisms employed for dispensing the tokens whether they be tickets or coinlike tokens. In copending application Ser. No. 697,118, a drive system is disclosed which involves dispensing of tokens as the meter is manually operated by the person buying time. A particular improvement of this invention involves actuation of the dispensing mechanisms during the return movement of the manually driven members so that uniform driving action can be achieved. Thus, the dispensing operation will not be dependent upon the force or speed of movement applied by the person buying time.

It is one object of the instant invention to provide a parking meter construction which is particularly adapted for the dispensing of tokens provided in the form of a roll of tickets.

It is a further object of this invention to provide a parking meter construction which includes token dispensing mechanisms which operate with a high degree of uniformity thereby avoiding the possibility of malfunctions which might develop because of nonuniform manual operation by persons buying time on the meter.

These and other objects of this invention will appear hereinafter and for purposes of illustration, but not of limitation, specific embodiments of the invention are shown in the accompanying drawings in which:

FIG. 3 is a horizontal, sectional view of the construction shown in FIG. 1;

FIG. 4 is a perspective view illustrating tickets of the type suitable for use in the construction of the invention;

FIG. 5 is a vertical sectional view taken about the line 5-5 of FIG. 3;

FIG. 6 is a detail view illustrating an alternative form of drive means employed in the operation of the construction;

FIG. 7 is a horizontal, sectional view illustrating an alternative dispensing arrangement;

FIG. 8 is a fragmentary, vertical sectional view of the construction shown in FIG. 7; and, FIGS. 9 through 11 comprise detailed views of operating elements utilized in the arrangement of FIGS. 7 and 8.

The apparatus of the instant invention employs mechanisms of the general type described in the aforementioned copending application. In such constructions, a handle means is employed for imparting driving movement to time-setting mechanisms as well as to the token-dispensing mechanisms. Turning of the handle means is effective to achieve the time-setting and token dispensing only if coins of a proper denomination are inserted in the meter.

Figure 1:
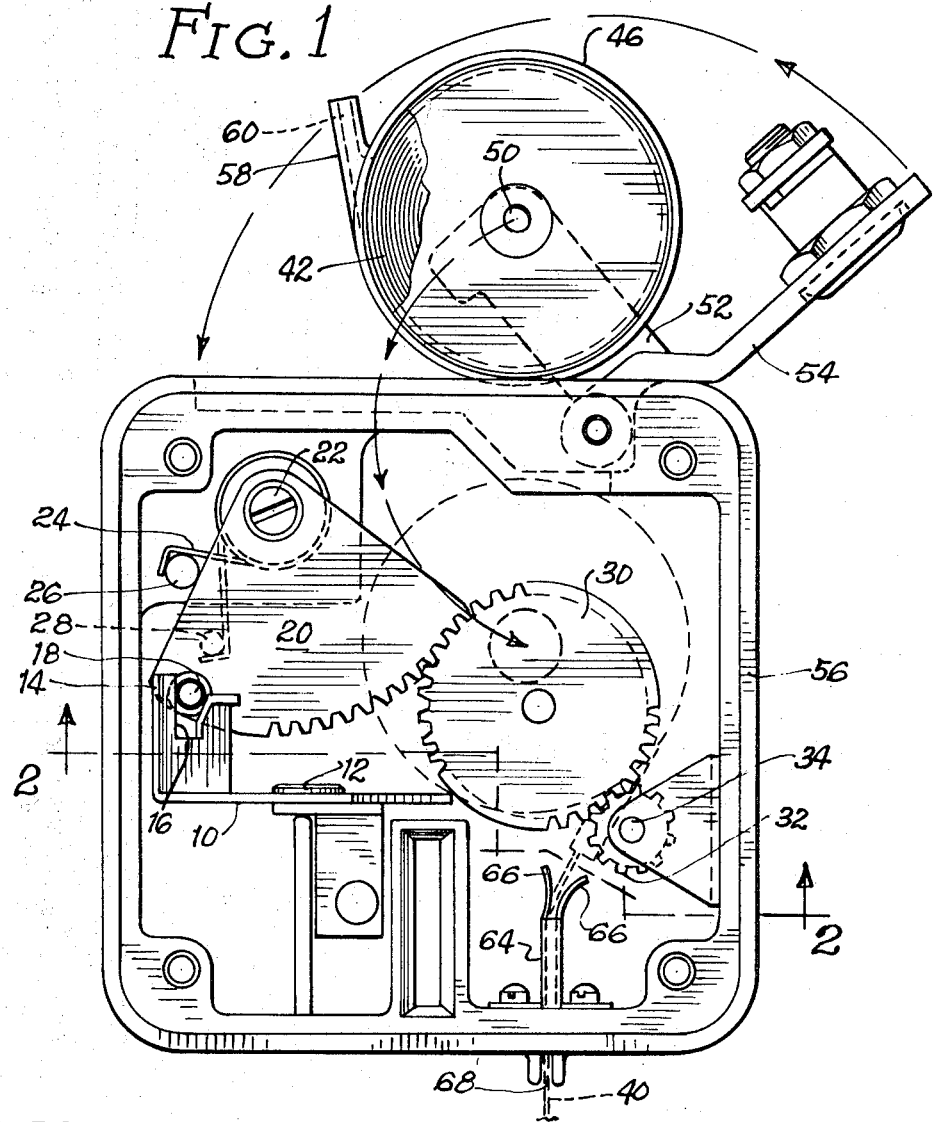
FIG. 1 is a plan view, partly cut away, of a token-dispensing structure adapted to receive a roll of tickets for dispensing tickets in accordance with the amount of time purchased.
Figure 2:
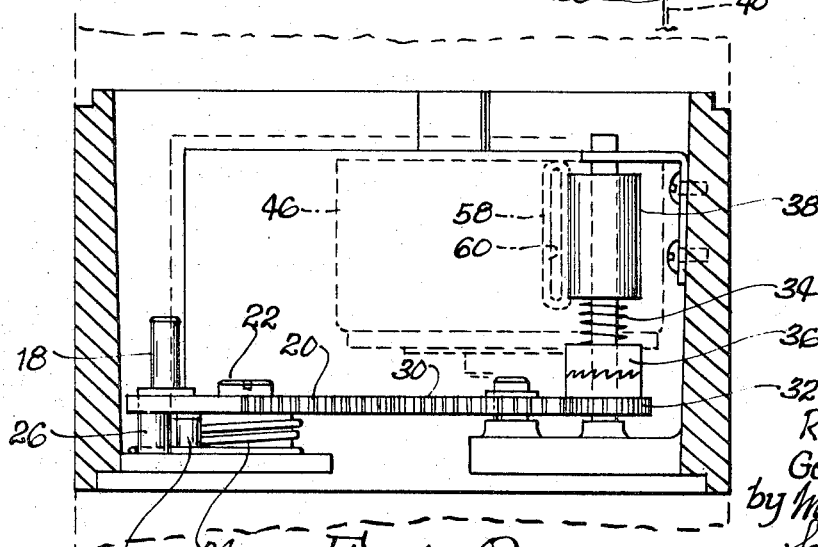
FIG. 2 is a vertical, sectional view taken about the line 2-2 of FIG. 1.

In describing the instant invention, it should be assumed that the driving action for token dispensing is accomplished in essentially the same manner as described in the aforementioned application. The driving action for the mechanisms shown in the accompanying drawings is imparted by means of a vertically extended arm 10. This arm is pivotally connected at 12 with the upper end of the arm being secured to elements which are driven during the time-setting operation. The lower end 14 of the arm defines a slot 16 which receives the post 18. This post is mounted on the quadrant gear 20 which is pivotally connected in the construction by means of the screw 22. A spring 24 is wrapped around this screw with one end of the spring engaging a pin 26 and with the other end of the spring-engaging pin 28. The pin 28 is attached to the quadrant gear and the spring, therefore, serves to normally hold the quadrant gear in the position shown in FIGS. 1 and 3.

When the arm 10 is pivoted during setting of time on the meter, the quadrant gear rotates and drives the gear 30. In the arrangement shown in FIGS. 1, 2, 3, and 5, the gear 30 is connected to pinion 32 which drives shaft 34. A slip clutch 36 is interposed between the shaft 34 and pinion 32 whereby the shaft 34 will rotate only during con counterclockwise movement of the pinion 32.

The shaft 34 carries friction roller 38 which bears against the ticket strip 40. The strip 40 is unwound from the roll of tickets 42 which is located on the spool 44 of the magazine 46. The spool 44 defines a vertical bore 48 which receives pin 50 located on the mounting plate 52. The plate 52 comprises an integral part of door 54 whereby opening of the door 54 will swing the magazine 46 outside the meter housing 56. This provides easy access for replacement of spent cartridges.

Each of the cartridges 46 includes a tangentially formed projection 58 which defines a rectangular internal passage 60. The strip 40 passes through this passage during the dispensing operation. As best shown in FIG. 3, the side wall of the projection 58 defines an opening 62 for receiving the friction roller 38. The roller may comprise a flexible composition so that it will press the strip 40 against the opposite wall of the projection 58 to insure good contact for driving movement of the strip.

A second passage member 64 is attached to the housing 56 for receiving the strip 40. The passage member 64 defines outwardly flared ends 66 to facilitate feeding movement of the strip through the passage. The passage terminates in a slot 68 so that individual tickets can be torn off by the person purchasing time on the meter. As explained in the aforementioned copending application, the dispensing movement of the quadrant gear 20 can be controlled, depending upon the denomination of the coin employed for purchasing time. For example, a nickel will provide dispensing movement sufficient to drive one ticket through the slot 68. A dime will provide sufficient additional movement to drive a pair of tickets through the slot.

In order to avoid the possibility of too many tickets being removed upon insertion of a coin, the perforations dividing the tickets are designed to provide very easy separation. Thus, the tickets should separate even if the purchaser simply pulls outwardly rather than attempting to tear off a ticket. Otherwise the individual using the meter might secure additional tickets by pulling outwardly and overcoming the frictional resistance of the roller 38.

In the construction described, the counterclockwise dispensing movement of the frictional roller 38 is achieved during counterclockwise movement of the quadrant gear 20. This movement of the quadrant gear is in turn accomplished while the individual purchasing time is rotating the handle of the meter. It has been found that some difficulties can be experienced because of the different forces which will be applied by different individuals during the meter operation. For example, some individuals will rotate the meter handle at a very high rate while others will be more deliberate during the operation. The dispensing mechanisms are then subjected to different operating conditions which can disrupt the dispensing action.

FIG. 6 illustrates a modified form of the invention wherein a roll of tickets is located for operation by essentially the same elements as those described above. Thus, the quadrant gear 20 operates to drive a gear 30 and a cartridge 46 is situated o for dispensing a strip of tickets 40. In this instance, however, the gear 30 drives a first pinion 70 which meshes with a second pinion 72. Each of these pinions carries a friction roller, and a slip clutch is interposed between the pinions and the friction roller.

In this instance, the dispensing movement is achieved during clockwise rotation of the pinion 70 and during clockwise rotation of the quadrant 20. Thus, the dispensing of the tickets will occur during the return stroke of the quadrant under the influence of the spring 22 rather than during the driving stroke. Since the force applied by the spring 22 can be controlled, it will be appreciated that the dispensing movement on the return stroke will be uniform when compared with dispensing movement on the driving stroke. Obviously, the clutch means interposed between the pinions 70 and 72, and their respective friction rollers can be adjusted to achieve the desired results. It will be appreciated in this connection that this aspect of the invention involving dispensing movement on the return stroke is not confined to the dispensing of tokens in the form of tickets. Coinlike tokens can be dispensed in this manner, for example, by altering the means employed in the aforementioned copending application.

FIGS. 7—11 illustrate an alternative arrangement for achieving dispensing movement on the return stroke. In this arrangement, the arm 10 and quadrant gear 20 are utilized for driving the gear 30. A bracket 80 (FIG. 9) is secured to the gear 30 for rotation therewith and a driving pawl 82 is pivotally mounted on the bracket and is normally held in the position shown in FIG. 7 by means of a spring 84 which extends between the lug 86 formed on the pawl and the post 88 carried by the bracket.

When the quadrant 20 rotates, the teeth 90 defined by the bottom of the cartridge 91 will be engaged by the camming projection 87 located adjacent the lug 86 on the pawl 82; however, the lug will ride over these teeth as the pawl pivots in opposition to the action of the spring 84. On the return stroke of the quadrant gear, the lug 86 will engage the cartridge for achieving dispensing movement.

A pivotally mounted element 94 (FIG. 11) is located opposite the bracket 80 and is provided with a projection 96 situated in the path of the teeth 98, these teeth being formed on the disc 99 which is tied to the gear 30. The teeth 98 pivot the element 94 and the associated lug 102 in opposition to the spring 100 when the quadrant gear rotates the cartridge on the return stroke. This clears the lug 102 to avoid interference with teeth 90 during the indexing movement; however, the lug 102 will prevent overrun of the cartridge since this lug will immediately move back into blocking position in the path of the next tooth 90. Obviously, if plural dispensing operations are to occur, the next tooth 98 will again move the element 94 out of blocking position, this operation occurring as long as the quadrant gear is imparting driving movement to the gear 30 which in turn drives the disc 99 carrying the teeth 98.

Dispensing of tokens from the cartridge 91 may be accomplished in the same manner as described in the aforementioned copending application. A door 104 is provided for removal of the tokens dispensed.

It will be understood that various changes and modifications may be in the above described constructions which provide the characteristics of this invention without departing from the spirit thereof particularly as defined in the following claims.

I claim:

1. In a token-dispensing parking meter wherein tokens are dispensed after the insertion of coins for setting of time on the meter, the improvement wherein said tokens comprise tickets, a cartridge, and means located within the meter for removably supporting the cartridge, a roll comprising a plurality of said tickets, means in said cartridge for supporting said roll within said cartridge, drive means rotatable in response to the setting of time on the meter, an opening in said cartridge through which said tickets are fed, a tangentially formed projection having an interior passage communicating with said opening through which the strip of tickets moves, a friction roller positioned adjacent said projection, and an opening defined in the sidewall of said projection for receiving said friction roller whereby the fir friction roller is adapted to press the strip of tickets against the opposite wall of the projection and to thereby drive the strip outwardly beyond said projection, said friction roller being connected to said drive means whereby tickets are dispensed from the cartridge in response to setting of time on the meter, and including passage means defined by the meter housing for delivering tickets to the exterior of the housing.

2. A construction in accordance with claim 1 wherein the drive means for operating a said drive roller are set during operation of the means for setting of time on the meter, and wherein said drive means rotate the friction roller for achieving dispensing movement at the completion of setting of time on the meter.

3. A construction in accordance with claim 2 wherein a pair of friction rollers engage the opposite surfaces of the strip of tickets.

4. In a token-dispensing parking meter construction wherein tokens are dispensed after the insertion of coins for setting of time on the meter, the improvement wherein drive means for achieving dispensing action are set during the time setting operation, the drive means operating to accomplish the dispensing action during return movement, said drive means comprising friction roller means, a drive pinion, clutch mean interposed between the drive pinion and the friction roller means, and a drive gear for rotating said drive pinion, and wherein said drive gear rotates said pinion during the time setting operation with said clutch means preventing rotation of the friction roller means, and wherein said drive gear rotates said pinion in the opposite direction during the return stroke of the time-setting means with said clutch means operating to drive said friction roller means during said return stroke.

5. A construction in accordance with claim 4 wherein said friction roller means engage a strip of tickets for dispensing of the tickets from the construction.

6. In a token-dispensing parking meter construction wherein tokens are dispensed after the insertion of coins for setting of time on the meter, the improvement wherein drive means for achieving dispensing action are set during the time-setting operation, the drive means operating to accomplish the dispensing action during return movement, said drive means including a drive gear, clutch means, and means connected to the clutch means for imparting dispensing movement to the tokens, and wherein said clutch means prevents operation of the dispensing means during movement of the drive gear in one direction during the time-setting operation while said clutch means provides for operation of said dispensing means during the return movement of said drive gear at the completion of the time-setting operation.

7. In a token-dispensing parking meter wherein tokens are dispensed after the insertion of coins for setting of time on the meter, and we wherein a cartridge carrying the tokens is mounted for movement in the meter, the dispensing action occuring as a result of the cartridge movement, the improvement wherein the means for achieving the dispensing action comprise drive means movable in one direction during the time-setting operation, a cartridge engaging pawl means associated with the drive means and movable therewith during the time-setting operation, means for disabling the cartridge engaging pawl during the time setting movement of the drive means, and means for releasing said cartridge engaging pawl upon resetting of the drive means at the completion of the time setting movement whereby said pawl operates to move said cartridge for dispensing tokens.